May 24, 1966 L. J. LOGAN 3,252,709
STUD CHUCK
Filed June 10, 1964
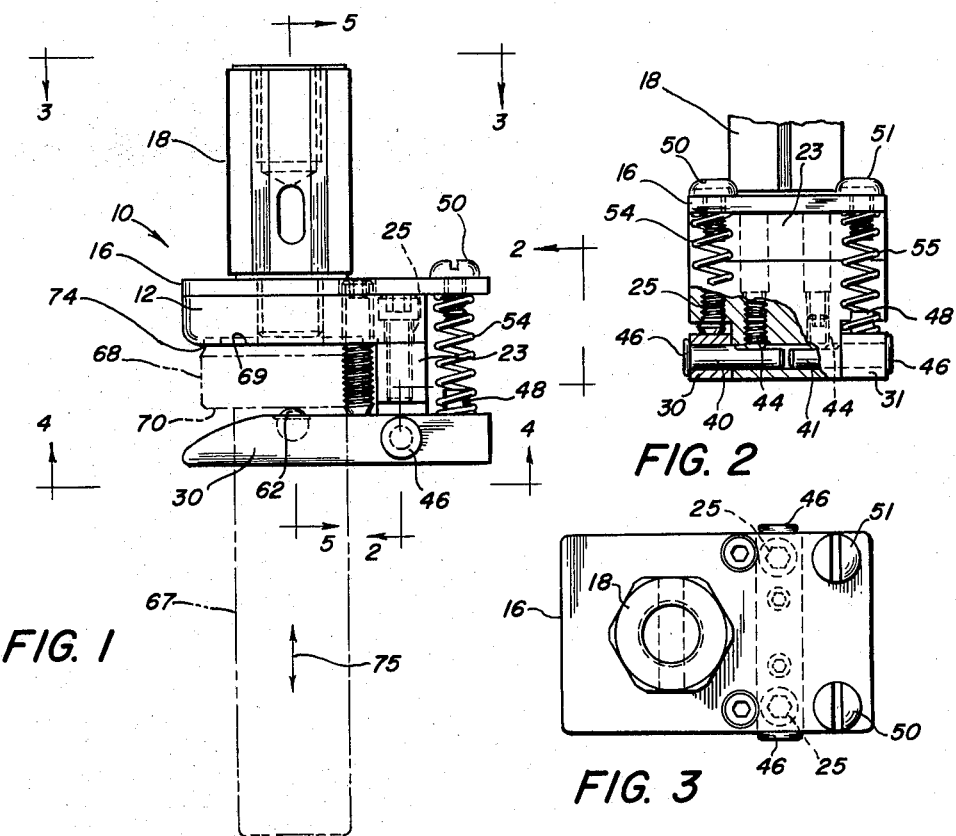
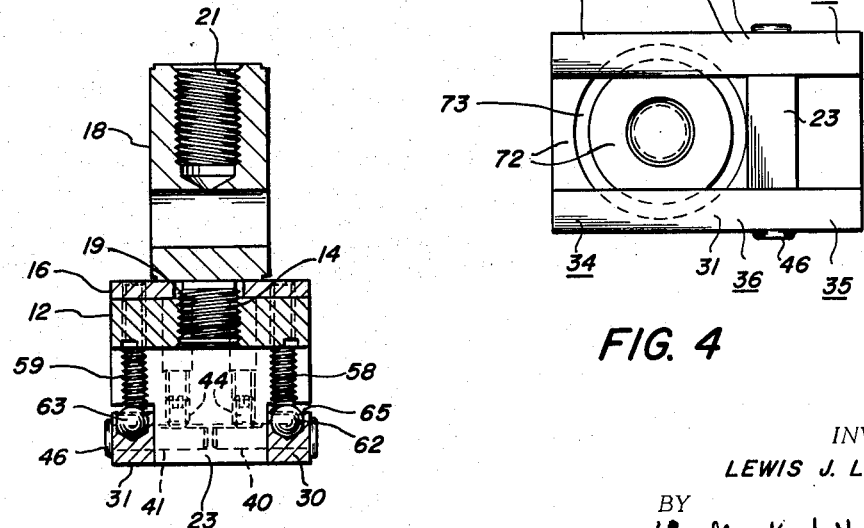
INVENTOR.
LEWIS J. LOGAN
BY
Woodling Krost Granger + Rust
Attys.

3,252,709
STUD CHUCK
Lewis J. Logan, 11820 Edgewater Drive, Lakewood, Ohio
Filed June 10, 1964, Ser. No. 374,019
4 Claims. (Cl. 279—106)

The invention relates in general to stud chucks used to hold headed weld stud members during a welding operation, and more particularly to such chucks having a new and novel gripping action.

An object of the present invention is to provide a stud chuck for holding a headed member which will permit limited misalignment of the member and still maintain good physical and electrical contact between the chuck and the headed member.

Another object of the present invention is to provide a stud chuck which has an exceptionally long commercial life.

Another object of the present invention is to provide a side loading stud chuck which includes first and second jaw means with the first jaw means being fixed relative to the second jaw means and the second jaw means including first and second independently pivoted and spaced members movable relative to said first jaw means.

Another object of the present invention is to provide a chuck for holding a weldable member with a head, which includes a flat surface for engaging the top surface of the head and first and second members for engaging spaced portions of the underside of the head and with the first and second members being independently movable and constantly urged toward the flat surface to firmly hold the weldable member.

Another object of the present invention is to provide a side loading chuck for holding headed members and having anti-friction means for aiding in inserting and removing headed members therefrom.

Other objects and a fuller understanding of this invention may be had by referring to the following description and claims, taken in conjunction with the accompanying drawings, in which:

FIGURE 1 is a side elevational view of the chuck of the present invention shown holding a headed weld stud in a dot-dash line position;

FIGURE 2 is a view taken generally along the line 2—2 of FIGURE 1;

FIGURE 3 is a view taken generally along the line 3—3 of FIGURE 1;

FIGURE 4 is a view taken generally along the line 4—4 of FIGURE 1; and,

FIGURE 5 is a view taken generally along the line 5—5 of FIGURE 1.

The chuck of the present invention illustrated in FIGURES 1 through 5 of the drawings has been identified generally by the reference numeral 10 and is utilized for the purpose of holding headed weld stud members during a welding operation. The chuck 10 is designed to be secured, by means of an adapter which will be described hereinafter, to the lifting mechanism of either a hand gun, as they are generally known in the stud welding industry, or a larger machine or apparatus which is adapted to weld a multiplicity of weld studs in sequential welding operations. These machines are those which are adapted to travel along the surface of a beam to weld studs thereto. The lifting mechanism conventionally is designed, through electrical circuit means, to raise and lower the weld stud and as a result the chuck which holds the weld stud and during these operations electrical energy is caused to pass through the chuck and weld stud and the member to which the weld stud is to be welded in a manner which is known to those skilled in the art.

The chuck 10 includes in combination a generally rectangularly shaped main mounting member 12 which has a threaded opening 14 extending therethrough. A flat plate member 16, which is of substantially the same configuration, resides on and flatly engages the top surface of the member 12 and also has an unthreaded opening therein which matches the threaded opening 14. An adapter 18 is provided which has a threaded portion 19 (FIGURE 5) which extends through the opening in the plate member 16 and threadably engages the opening 14 in member 12. The adapter has a threaded opening 21 in its upper portion which is utilized to conveniently attach the chuck 10 to the lifting mechanism of a weld gun which has not been shown, but which is readily understood and appreciated by those skilled in the art. The main mounting member 12 also includes a separate part which is referred to as a T-shaped finger mounting member 23 which extends at right angles to the member 12 and is secured by means of two screw members, both identified by the reference numeral 25. First and second fingers are located in spaced relation to the main mounting member 12 and these fingers have been identified by the reference numerals 30 and 31. Each of these fingers is provided with first and second end portions 34 and 35 respectively and an intermediate portion 36. The intermediate portions of the first and second fingers 30 and 31 are pivotally connected to opposite sides of the T-shaped member 23 by means of first and second pivot pins 40 and 41 respectively which extend through respective openings in the intermediate portions of the fingers 30 and 31 and into corresponding openings in opposed sides of the T-shaped member 23. The pivot pins are held in a fixed position by means of screws 44 as best seen in FIGURE 2, and the fingers are prevented from axial outward movement relative to the pins 40 and 41 by means of heads 46 on the pivot pin members.

The second end portion of each of the finger members is provided with a guide pin 48 and located directly above the guide pins and positioned in the right end of the flat plate member 16 on opposed sides thereof are guide screws 50 and 51. A first spring member 54 extends between the guide pin 48 on finger 30 and the guide screw 50 and a second spring member 55 extends between the guide pin 48 on the second finger 31 and the guide screw 51. These two spring members 54 and 55 cause a force to be constantly exerted against the respective fingers tending to move the first end portion of the fingers toward the main mounting member 12. In order to limit the upward movement of the first end portions of the fingers toward the mounting member 12, first and second stop members 58 and 59 (FIGURE 5) respectively are provided in the mounting member in position to engage the first end portions of the first and second fingers 30 and 31. The stop members 58 and 59 are usually so positioned that a headed member can be slid sideways between the mounting member 12 and the fingers 30 and 31 with the space between these two elements being slightly less than the thickness of the head so that when the head member is in position a force will be exerted against it. First and second ball or anti-friction members 62 and 63 are respectively located in the upper surface of the first end portions of the first and second fingers 30 and 31. FIGURE 5 best shows the mounting of the ball members 62 and 63 and it will be seen from this view that the balls are located in their respective openings and the portion of the opening as at 65 is of slightly less size than the diameter of the ball thereby preventing removal of the ball from its socket. This construction can be conveniently accomplished by peaning this portion of the opening after the ball has been inserted, or by other convenient means. The balls in the position shown in the drawings are adapted for rotational movement and aid in conveniently receiving the head member in the chuck.

FIGURE 1 shows in dot-dash lines a headed weldable stud member 67 which can be held by the chuck of the present invention. The stud 67 as shown includes a head 68 with an upper surface 69 and a lower surface or underside 70. The main mounting member 12 at the position where it is engaged by the upper surface 69 of the stud head is a flat surface identified by the reference numeral 72 (FIGURE 4) and an annular groove 73 is provided in this flat surface and this groove 73 is designed to be located so that the peripheral edge 74 of the upper surface 69 of the stud head is located or coincides with the groove. The reason for this is that in the storage and handling of the stud members this portion of the stud in many instances becomes burred and bumped, resulting in an uneven edge, which, when engaging the flat surface 72, tends to cock or misalign the stud. With this construction, any burring of this peripheral edge will reside within the annular groove 73 and will have less of a tendency to misalign the stud.

In operation, the chuck 10 is used in combination with a welding gun or mechanism and is secured to the lifting portion thereof by means of the adapter 18. The lifting mechanism is designed to move the stud 67 in the direction of the arrows 75 shown in FIGURE 1. The stud 67 is inserted into the chuck in a direction which is transverse or at right angles to the arrows 75. With this insertion the upper surface 69 of the stud head engages the flat surface 72 of the main mounting member 12 and the underside 70 of the stud head on either side of the stud proper is engaged by the first and second fingers 30 and 31 by way of the ball members 62 and 63. The spring members 54 and 55 exert a holding force causing the chuck to grip the head of the stud. The independent pivotal or swingable mounting of the fingers 30 and 31 insures a good mechanical and electrical connection between what may be called the first and second jaw means of the chuck. The first jaw means may be referred to as the main mounting member 12 and the second jaw means includes the separately mounted fingers 30 and 31. It will thus be seen that if a foreign object is located between the stud head on one side of the first jaw means or between one of the fingers 30 and 31, which may tend to misalign the stud, it will not have a tendency to prevent a good physical and electrical contact at the other finger or at the other side of the first jaw means. It will be well appreciated by those skilled in the art that the stud is capable of being welded with some physical misalignment, however, it is necessary that the stud be physically held so that good electrical connection is made between the first and second jaw means. After the stud is inserted into the chuck the electrical control apparatus of the welding gun is properly manipulated in a manner well known to those skilled in the art and subsequently electrical current passes through the jaws of the chuck and through the head and body of the stud to properly weld the lower end portion of the stud to a suitable member such as a steel beam or the like. After the welding operation, the chuck and the stud head are separated by merely pulling the chuck off of the head of the stud, for example to the right as seen in FIGURE 1.

It will thus be seen as a result of the above detailed description that a stud chuck has been provided which is capable of side loading and unloading weld studs thereinto and which has an exceptionally long commercial life because of the unique construction of the first and second jaw means which provides an excellent physical and electrical connection between the chuck and weld studs held thereby.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A chuck for holding a headed stud member in a welding apparatus during a welding operation including in combination a main mounting member having a threaded opening therein, a flat plate member of substantially the same configuration flatly engaging the top of said mounting member and having an opening therein, an adapter threadably residing in said threaded mounting member opening to hold said flat plate member in position and also to provide a means for connecting said chuck to the lifting means of a welding apparatus, a generally T-shaped finger mounting member secured to said main mounting member and extending generally at a right angle thereto, first and second fingers each having first and second portions and an intermediate portion, first and second pivot members extending through the intermediate portion of said first and second fingers respectively and into opposite sides of said T-shaped finger mounting member to pivotally mount said first and second fingers, first and second stop members extending downwardly from opposed side portions of said main mounting member in position to engage said first and second fingers and limit the movement of said first end portions thereof toward said main mounting member, first and second spring members extending from said flat plate member at one end portion and at the other end portion engaging said second end portion of said first and second fingers respectively to constantly urge said first end portions of said fingers upwardly toward said main mounting member, and a ball member carried by the upper surface of said first end portion of each of said fingers for engaging the underside of the head of a stud member.

2. A chuck for holding a weld stud having a head with upper and lower sides and with a body extending generally axially therefrom, including a main mounting member having a flat surface, wall means defining an annular groove in said flat surface, the upper side of the head engaging said flat surface and the peripheral edge of the upper side overlying said annular groove when a stud is held in said chuck, first and second fingers, pivot means for pivotally mounting each of said fingers in generally parallel spaced relationship to each other and independently of each other on axes generally normal to the axis of the body of a stud when same is held by said chuck, means cooperating with each of said fingers to normally locate same generally parallel with said flat surface of said mounting member and spaced therefrom and exerting a force on each of said fingers tending to move same toward said flat surface, whereby a stud is adapted to be held in said chuck with the upper side of the head in engagement with said flat surface and the lower side of the head engaged by said first and second fingers on opposed sides of the body and the stud is adapted to be inserted into and removed from said chuck in a direction generally parallel to said fingers and normal to the axis of the body and anti-friction means carried by each of said fingers and adapted to cooperate with the lower side of the head of the stud to facilitate insertion and removal of the stud.

3. A chuck for holding a weld stud having a head with upper and lower sides and with a body extending generally axially therefrom, including a main mounting member having a generally flat surface, the upper side of the head engaging said flat surface when a stud is held in said chuck, first and second fingers, pivot means for pivotally mounting each of said fingers in generally parallel and spaced relationship to each other and independently of each other on axes generally normal to the axis of the body of a stud when held by said chuck, means cooperating with each of said fingers to normally locate same generally parallel with said flat surface of said mounting member and spaced therefrom and exerting a force on each of said fingers tending to move same toward said flat surface, whereby a stud is adapted to be held in said chuck with the upper side of the head in engagement with said flat surface and the lower side of the head engaged by said first and second fingers on opposed sides of the body and the stud is adapted to be inserted into and removed from the chuck in a direction generally parallel to said fingers and normal to the axis of the body.

4. A chuck for holding a weld stud having a head with upper and lower sides and with a body extending therefrom, including a mounting member, the upper side of the head engaging said mounting member when a stud is held in said chuck, first and second fingers, pivot means for pivotally mounting each of said fingers in spaced relationship to each other and independently of each other on axes generally normal to the length of the body of a stud when held by said chuck, said fingers normally located generally parallel with said mounting member and spaced therefrom, means exerting a force on each of said fingers tending to move same toward said mounting member, whereby a stud is adapted to be held in said chuck with the upper side of the head in engagement with said mounting member and the lower side of the head engaged by said first and second fingers on opposed sides of the body and the stud is adapted to be inserted into and removed from the chuck in a direction generally normal to the length of the body.

References Cited by the Examiner

UNITED STATES PATENTS

| | | | |
|---|---|---|---|
| 627,669 | 6/1899 | Jenkins | 269—254 |
| 1,239,873 | 9/1917 | Bright | 279—106 |
| 1,851,843 | 3/1932 | Inman | 287—119 |
| 2,432,137 | 12/1947 | Burke | 269—254 |

LESTER M. SWINGLE, *Primary Examiner.*

ROBERT C. RIORDON, *Examiner.*

H. V. STAHLHUTH, *Assistant Examiner.*